United States Patent
Johnson

[15] 3,697,210
[45] Oct. 10, 1972

[54] CLOSURE DEVICE FOR MULTIPLE INJECTION BLOW MOLDING MACHINE

[72] Inventor: Joseph A. Johnson, Brigantine, N.J.
[73] Assignee: Jomar Industries, Inc., Brigantine, N.J.
[22] Filed: Aug. 24, 1970
[21] Appl. No.: 66,442

[52] U.S. Cl.................................425/168, 425/242
[51] Int. Cl. ............................................B29d 23/03
[58] Field of Search ........18/5 BM, 5 BP, 5 BJ, 5 BB, 18/5 BA, 5 BR, 20 B, 2 RM, 2 RP; 74/110; 425/242, 168

[56] References Cited

UNITED STATES PATENTS

| | | | |
|---|---|---|---|
| 3,100,913 | 8/1963 | De Matteo | 18/5 BJ |
| 2,524,343 | 10/1950 | Diener | 74/110 X |
| 3,186,244 | 6/1965 | Baker et al | 74/110 X |

*Primary Examiner*—J. Spencer Overholser
*Assistant Examiner*—Michael O. Sutton
*Attorney*—Stowell & Stowell

[57] ABSTRACT

A closure device for blow molding apparatus having a rotatable turret with parison pins projecting from the face thereof and separable mold halves encompassing the pins to define mold cavities thereabout. A lever interconnects the movable segment of the mold half and a relatively fixed pivot point. The turret is connected to the lever intermediate the pivot point and the mold half to move a fraction of the distance of the mold half such that the pins and molded objects thereon clear the mold halves upon opening thereof for rotation of the turret.

3 Claims, 5 Drawing Figures

INVENTOR
JOSEPH A. JOHNSON

BY Stowell & Stowell

ATTORNEYS

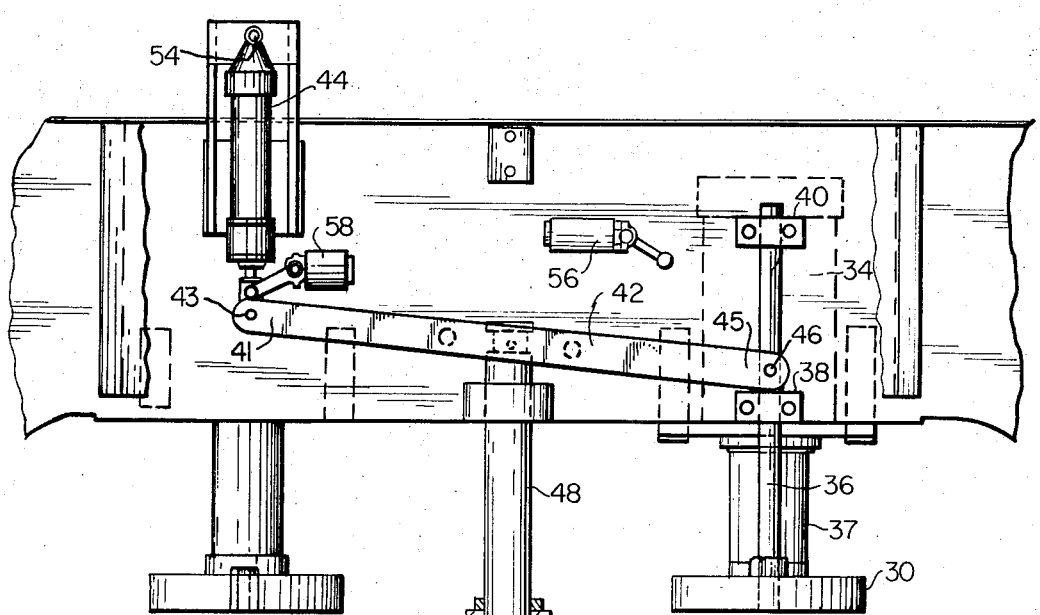
FIG. 3
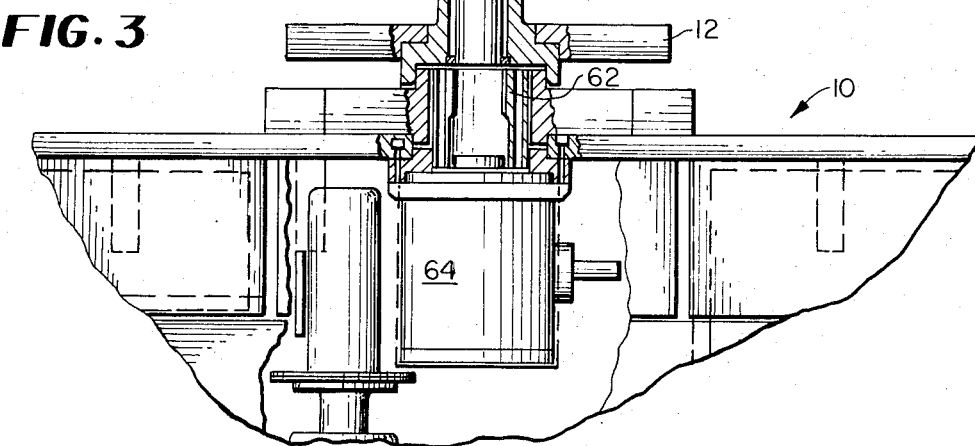
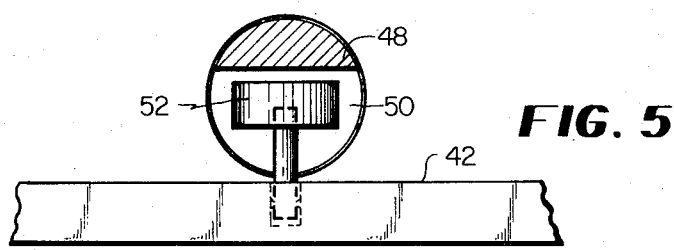
FIG. 5
INVENTOR
JOSEPH A. JOHNSON
BY *Stowell & Stowell*
ATTORNEYS

CLOSURE DEVICE FOR MULTIPLE INJECTION BLOW MOLDING MACHINE

BACKGROUND OF THE INVENTION

1. Field of the Invention

The present invention generally appertains to improvements in injection blow molding machines for automatically forming hollow articles, such as bottles, from plastic materials and more particularly relates to new and novel improvements in a closure device for multiple station injection blow molding machines.

2. Description of the Prior Art

Injection blow molding machines that automatically operate to form a number of hollow articles, such as bottles, from plastic materials are fairly common in the art and in industrial usage. A machine of the type involved is more fully described in applicant's co-pending application, Ser. No. 52,807, filed July 7, 1970. Such a machine has a number of operating stations surrounding a horizontally disposed elevatable and rotatable turret which has side faces carrying distinct sets of parison pins. The turret is surrounded by the angularly placed stations which include parison mold stations, blow mold stations and ejection stations. The turret is indexed from the parison mold stations, to the blow mold stations and then to the ejection stations to cause the parison pins to operatively successively occupy such stations with all stations being simultaneously operative.

Each parison mold station is composed of separable mold halves with the bottom halves being fixed and the movable upper halves being carries by rams which clamp the mold halves together about the parison pins. An injection unit injects plastic melt into the closed parison molds around the parison pins to a preset pressure after which the parison molds are opened.

The turret is then raised to lift the pins from the bottom mold halves and the turret is indexed to bring the parisons to the blow mold stations where the parisons are located in blow molds. With the parisons located in the blow molds pressurized air is passed through the parison pins to inflate the parisons to the configuration and size determined by the interior shape and size of the blow molds.

On completion of the blow molding, the turret is rotated in the same direction to bring the parison pins to the ejection stations where the formed articles are removed from the pins.

A problem that has been encountered with such machines lies in the separation of the halves of the parison or preform molds and the associated elevation and indexing of the turret carrying the parison pins. Unfortunately, the mold halves open independently and the turret is lifted independently so that proper clearance for the pins is not always provided.

SUMMARY OF THE INVENTION

The present invention provides a machine that overcomes and eliminates the problems of known machines and that operates at a dependably fast production rate.

Consanant with such objects, another object of the present invention is to provide such a machine with synchronized movements between the parison mold halves and the turret.

The invention also furnishes a relatively simple, inexpensive and maintenence free mechanism for synchronizing movements between the movable parison mold half and the turret by providing a lever interconnection which reduces the movement of the turret to produce requisite clearance of the components.

In a preferred embodiment, the invention provides a synchronizing device for movement between a movable mold half and a rotating turret carrying parison pins including actuating means to move the movable mold half with respect to the fixed mold half; a lever interconnecting the movable mold half and a relatively fixed pivot point, the turret being connected to the lever intermediate the movable mold and the pivot point to move a fractional distance therewith upon movement of the movable mold half.

These and other attendant advantages will become better understood to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 3 is an enlarged fragmentary view, partly in section, of a portion of the machine as shown in FIG. 2;

FIG. 5 is a sectional view of FIG. 4 taken along the lines 5—5 thereof.

DESCRIPTION OF THE PREFERRED EMBODIMENT

Figure 1:
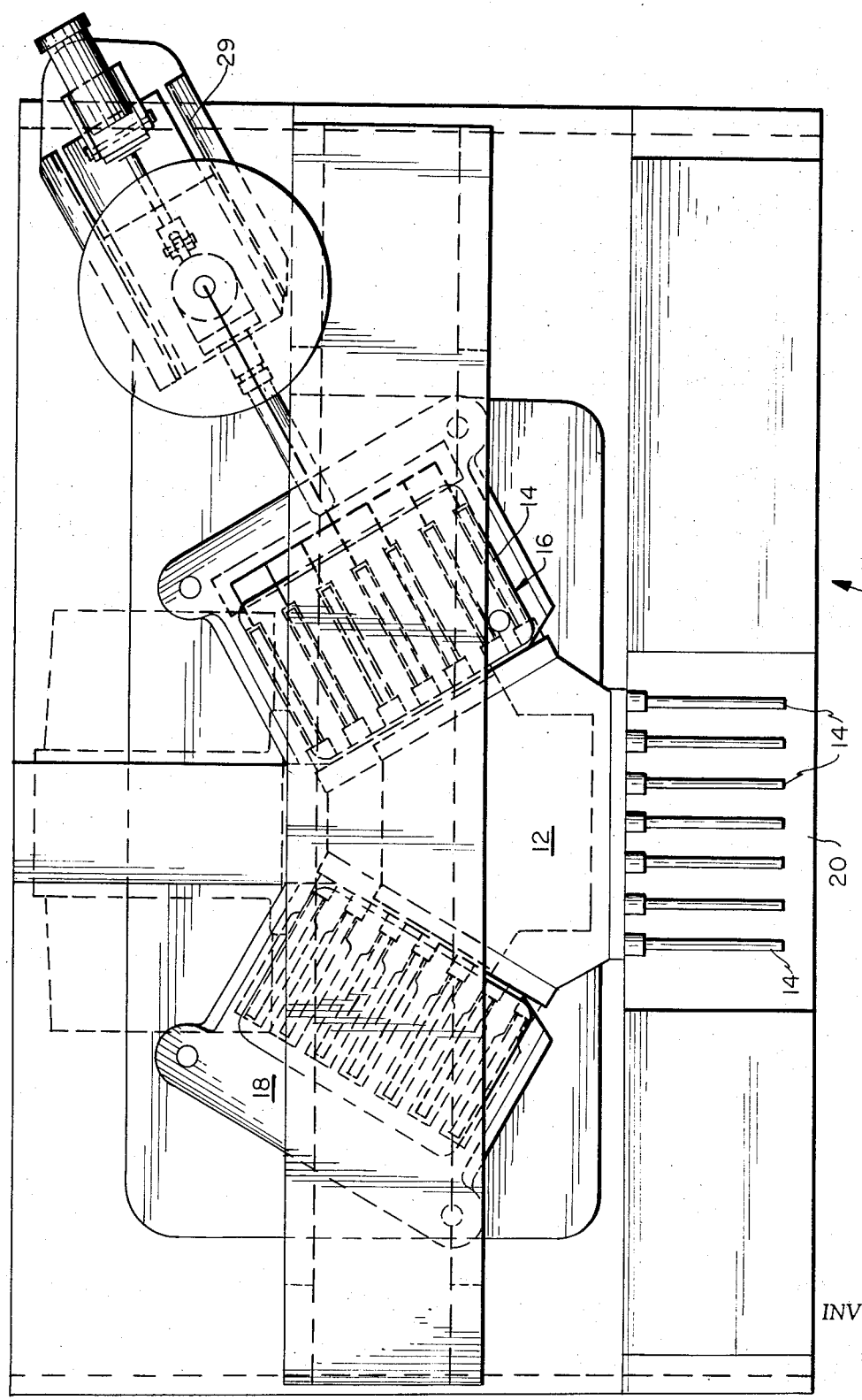
FIG. 1 is a plan view of a blow molding machine incorporating structure in accordance with the invention.
Figure 2:
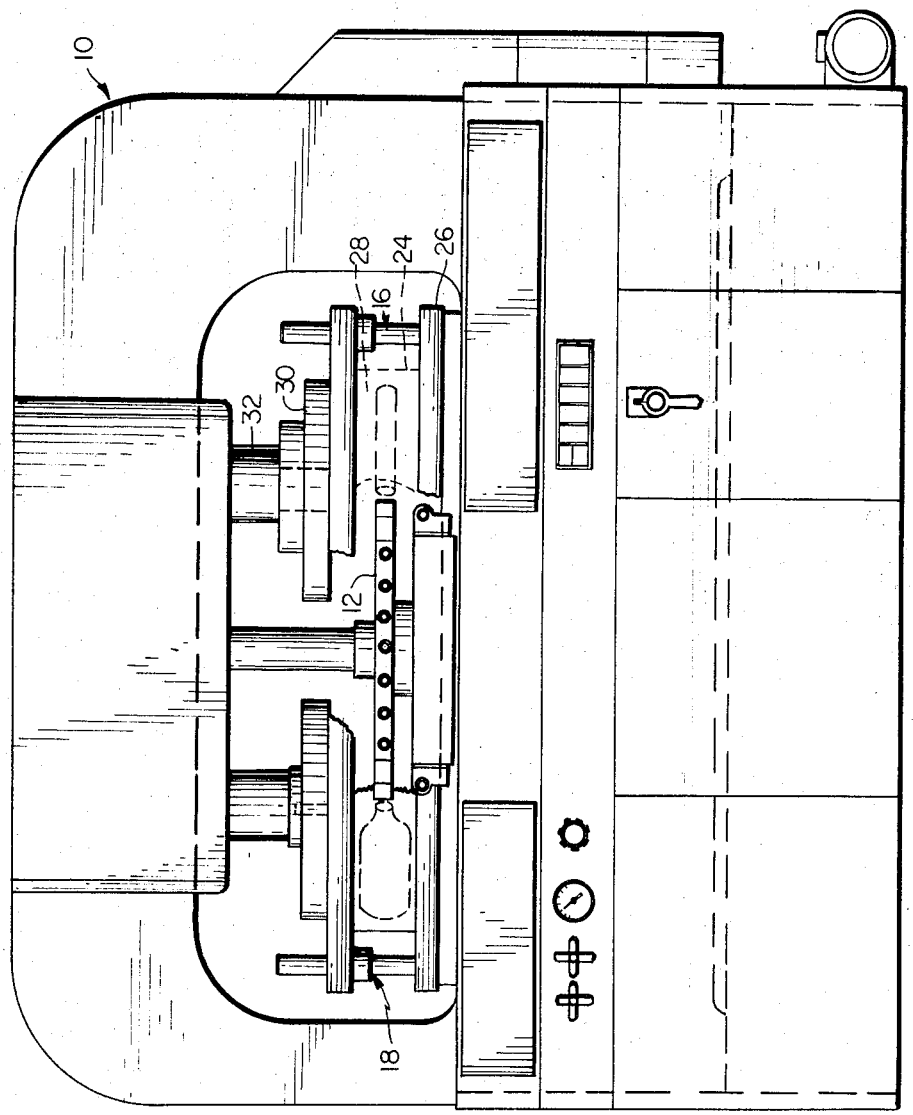
FIG. 2 is a front elevational view of the machine of FIG. 1.

In FIGS. 1 and 2 a blow molding apparatus or machine is generally referred to at 10. As indicated above, the general operation of machines of this type is more fully described in applicant's referred to co-pending application and it will suffice, for the purposes of this invention, to indicate that the device comprises a rotatable and elevatable turret 12 which has three faces equally spaced 120° apart with sets of outwardly extending parison pins 14 on each face.

Surrounding the turret are, in counter-clockwise order, a preform or parison mold station 16, a blow mold station 18 and an ejection station generally indicated at 20.

As is more fully described in the aforementioned co-pending application the mold stations 16 and 18 are provided with horizontally split mold halves which separate vertically to allow the turret 12 to be raised as seen in FIG. 2 and rotated by indexing means (not shown) so that the parison pins are indexed between stations 14, 16 and 18 in sequence or in any other manner desired. Although the device in the referred to co-pending application is provided with two opposed stations for each operation and the cycling is other than straight sequence, the machine may include less stations, as in the illustrated device, and may be operated in an analogous manner to form blow molded objects.

With reference more specifically to FIG. 2 the preform mold station 16 includes a lower half parison mold 24 mounted on stationary platen 26 and a movable complimentary upper half parison mold 28 mounted on a pressure pad 30 attached to the end of a ram or piston rod 32 of a hydraulic cylinder 34 (FIG. 3). When the piston rod 32 is brought down hydraulically the parison mold halves 24 and 28 close about associated parison pins to define a cavity thereabout. The cavity is then filled with heated plastic material from an injection unit 29 which is fed to the cavity for a set period of time.

The ram 32 operates under a relatively high pressure and, in accordance with this invention, some of the operating pressure is utilized to raise and lower the turret 12 thereby providing synchronous movement between the parison mold and the turret. Such movement is important in that, in order to clear the mold halves 24 and 28 the pins 14 and parisons formed thereon must be raised from the lower half 24 yet cannot be raised the full distance of movement of the upper half 28 since the pins and parisons must also clear the upper half cavity portions.

Referring now more particularly to FIG. 3, the mechanism for synchronous movement between the ram 32 and the turret 12 is illustrated in detail. Such mechanism comprises a follower rod 36 mounted on the pressure pad 30 and slidably guided parallel to the piston rod 32 by bearings 38 and 40. A lever arm 42 has end 41 pivotally mounted to the extended end of a secondary hydraulic ram 44 via pivot pin 43. The opposite end 45 of the pivot arm 42 is pivotally attached to the follower rod 36 at pivotal connection 46. Thus, as the pressure pad 30 is moved in a vertical direction from the mold closed to the mold open positions, the lever arm 42 is raised through its pivotal connection 46 to the follower rod 36 and in so moving the rod 42 pivots about pivot pin 43 carried at the extended end of the piston rod of hydraulic ram 44.

The turret 12 is connected to a vertical actuator shaft 48 which serves to provide means to raise or lower the turret as necessary. As can be seen, the shaft 48 is connected to the lever 42 proximate the mid-portion thereof such that movement of the turret 48 is approximately one-half the movement of the ram 32 thereby providing the requisite synchronous movement between the turret 12 and the mold halves 24 and 28 to allow rotation of the turret in the operation of the machine.

Figure 4:
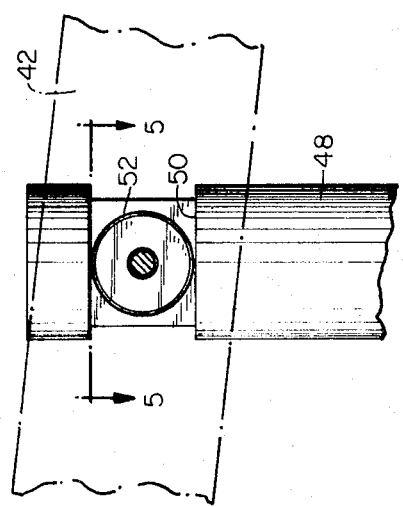
FIG. 4 is a further enlarged detail elevational view of a portion of the apparatus shown in FIG. 3.

With particular reference to FIGS. 4 and 5, a connection between the shaft 48 and the lever arm 42 is shown. Since any single point on the lever arm 42 follows an arcuate path upon movement of the arm, some provision must be made for lateral movement of the connection between the lever arm and the shaft. Such connection comprises a slot 50 formed across the shaft 48 and a roller 52 rotatably mounted on the lever arm 42 and disposed to ride in the slot 50. Upon movement of the lever arm 42, the roller is displaced along the slot while driving interconnection is maintained between the components.

With reference again to FIG. 3, the secondary hydraulic cylinder 44 provides a means of raising the pressure pad 30 while maintaining the turret 12 in a lowered position, a capability which can be of importance if, for example, the position of the parison pins 14 in the lower mold half needs to be examined. If the cylinder 44 is actuated to extend simultaneously with retraction of the pressure pad 30, the lever arm will pivot about the roller 52 in the slot 50 and the turret 12 will remain in place. The cylinder 44 is pivotally mounted at its upper end via pivot pin 54 so that lateral motion between that cylinder and the ram 32 upon movement of the lever arm 42 will be accommodated thereby.

A limit switch 56 is disposed above the ram end of the lever arm 42 and is connected to the cylinder 34 to interrupt operation thereof when that end of the lever arm is lifted to actuate the switch. A second limit switch 58 is disposed above the secondary hydraulic cylinder end of the arm 42 and is connnected to the secondary hydraulic cylinder 44 to interrupt operation thereof when that end of the arm is raised to actuate the switch.

The turret 12 is supported by a rotatable shaft assembly 62 which has an electric motor 64 to index the turret between stations.

When the mold halves are opened, the turret 12 is next indexed to place the pins 14 carrying the parisons at the blow mold station 18, whereupon the blow mold halves are closed about the parisons which are then expanded to assume the form and size of the interior of the molds by air under pressure through the parison pins.

After separation of the blow mold halves, the turret 12 is then indexed again to place the molded articles at the ejection station 20 for stripping by means such as is described in greater detail in applicant's co-pending application entitled "Stripper For Blow Molding Machine" filed even date herewith. After stripping, the cycle is repeated. The parison pins 14 on the remaining faces of the turret are, of course, indexed at adjacent stations so that for each of the above described cycles, the other phases of the formation are simultaneously being carried out.

Although a machine operating as described above is preferred, it should be understood that this invention may be incorporated in any blow molding machine from which plural articles formed on parison pins must be stripped.

What has been set forth above is intended as exemplary to enable those skilled in the art to practice the invention.

What is new and desired to be protected by Letters Patent of the United States is:

1. In a blow molding apparatus having an indexable turret with parison pins projecting outwardly from the face thereof and separable movable and fixed mold halves closing about said pins to define mold cavities thereabout the improvement comprising a turret-mold synchronizing device including actuating means to move said movable mold half with respect to said fixed mold half, and lever means interconnecting said movable mold half and said turret to simultaneously move said turret with said movable mold half such that said pins and articles formed thereon are disposed in cavities defined by said mold halves when together and clear of said mold halves for indexing of said turret when said mold halves are apart, said lever means extending between a normally fixed pivot point and said actuating means to move about said actuating means and said turret being connected to said lever means intermediate said pivot and said actuating means such that said turret moves a fraction of the distance of said actuating means upon operation thereof.

2. A device in accordance with claim 1 wherein said turret is connected to said lever means substantially midway between said pivot and said actuating means such that said turret moves approximately one-half the distance of said actuating means.

3. A device in accordance with claim 2 wherein a second actuating means supports said normally fixed pivot point, said second actuating means being actuable a distance equal and opposite to said first mentioned actuating means to thereby provide for raising of said movable mold half without movement of said turret.

* * * * *